United States Patent
Yanagida et al.

[11] 3,944,414
[45] Mar. 16, 1976

[54] TREATMENT OF ANODE SLIME FROM COPPER ELECTROLYSIS

[75] Inventors: Tokio Yanagida, Osaka; Ariyoshi Saito, Omiya; Naoyuki Hosoda, Toyonaka; Fukuzo Kaneko, Omiya, all of Japan

[73] Assignee: Mitsubishi Kinzoku Kabushiki Kaisha, Japan

[22] Filed: Oct. 1, 1974

[21] Appl. No.: 511,475

[52] U.S. Cl. .................. 75/99; 75/83; 75/101 R; 75/117; 75/118 R
[51] Int. Cl.² .................................... C22B 7/00
[58] Field of Search ........ 75/101 R, 117, 118 R, 99, 75/83

[56] References Cited
UNITED STATES PATENTS

| | | | |
|---|---|---|---|
| 2,031,299 | 2/1936 | Betterton | 75/99 |
| 2,048,563 | 7/1966 | Poland | 75/99 X |

*Primary Examiner*—G. Ozaki
*Attorney, Agent, or Firm*—Robert E. Burns; Emmanuel J. Lobato; Bruce L. Adams

[57] ABSTRACT

Process for the flotation of anode slime from copper electrolysis comprising subjecting the anode slime, as a preliminary treatment, to attrition treatment in combination with a copper leaching treatment in a medium of an acid solution. The floated material obtained from the flotation is continuously subjected to three processes of roasting, melting and cupellation in a rotary furnace lined with refractory bricks for recovery of good quality silver anode.

9 Claims, 8 Drawing Figures

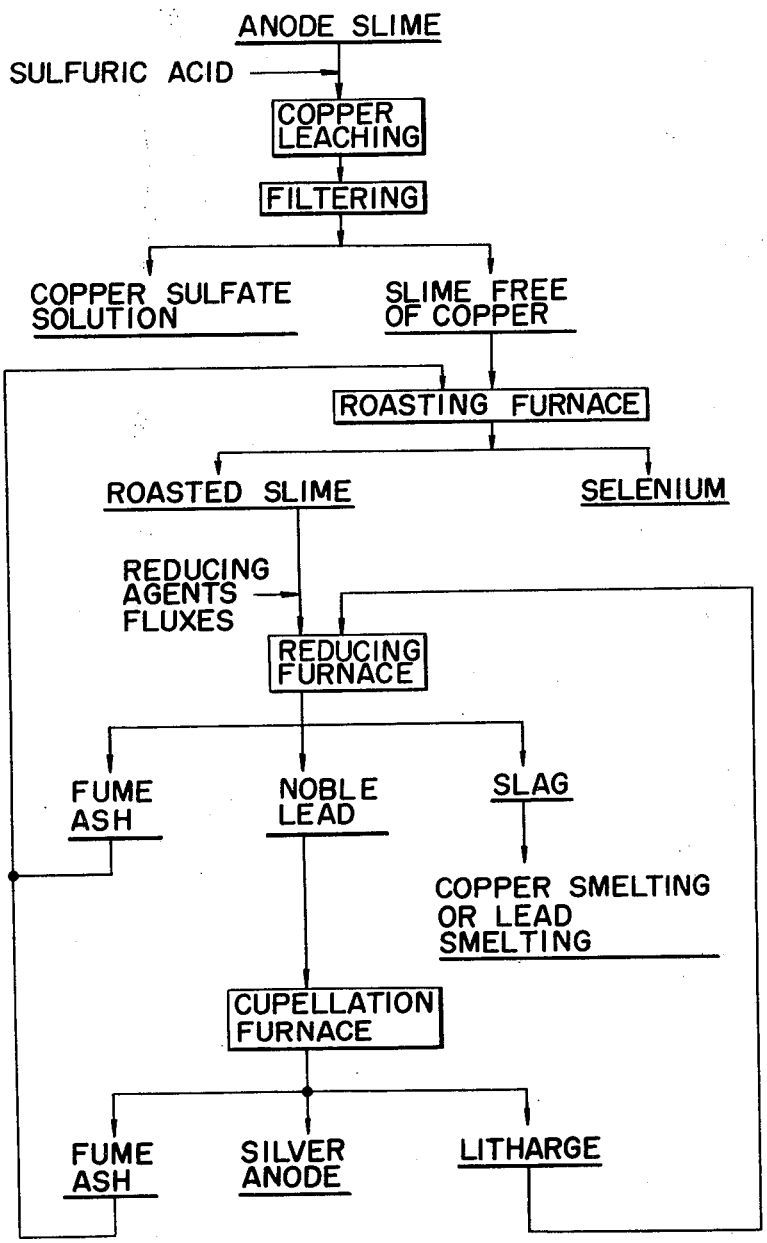
FIG. 4 (A) PRIOR ART

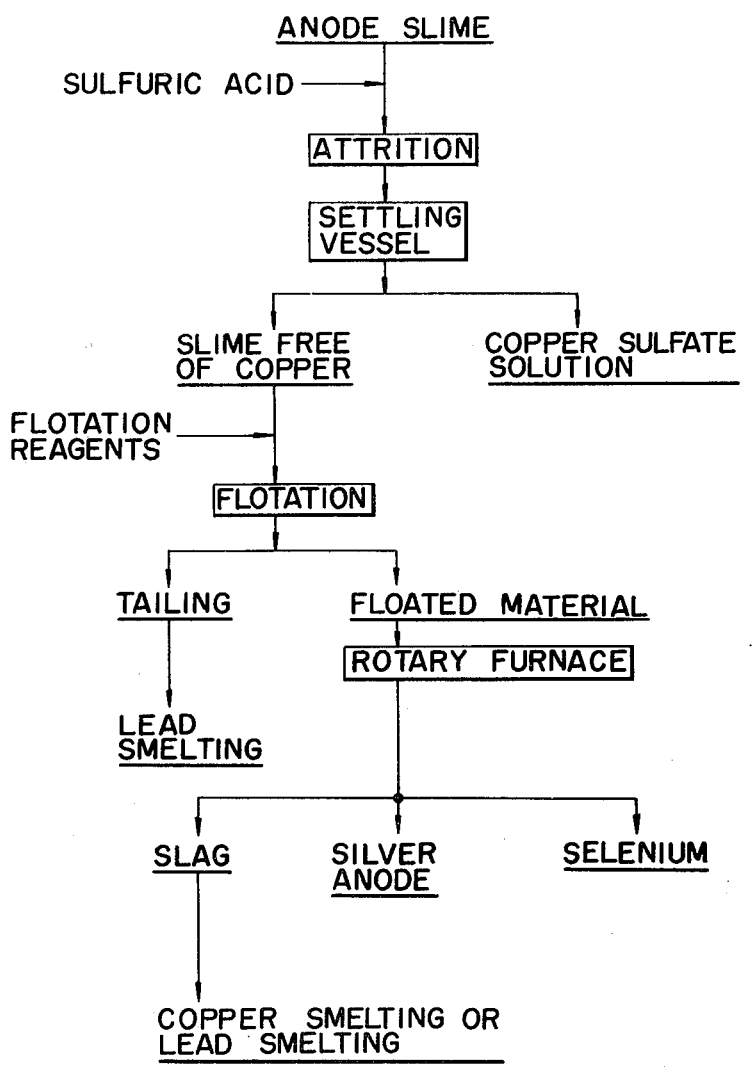

TREATMENT OF ANODE SLIME FROM COPPER ELECTROLYSIS

BACKGROUND OF THE INVENTION

The present invention relates to an improved process for treating anode slime from copper electrolysis.

In the electrolysis of crude or blister copper for obtaining electrolytic copper, the byproduct anode slime resulting therefrom contains valuable metals such as gold, silver, copper, lead, selenium, and the like. The recovery of these valuable metals by treating such anode slime is of great importance in a copper refinery process.

Methods of treating the anode slime to recover the valuable metals contained therein which have been heretofore proposed comprise extremely complicated processes wherein these valuable metals are extracted one by one and gold and silver are finally recovered, although these methods may be somewhat modified depending upon the composition of the anode slime.

The main factor making the recovery process complicated is, inter alia, the presence of lead which is usually contained in an amount of about 10 to 30 % in the anode slime. For example, in the roasting process for recovering selenium, the presence of lead may reduce volatilization of the selenium. Also, in recovering gold and silver, some of the reduced lead must be re-oxidized and separated in the subsequent cupellation process. Such repeated oxidation and reduction of the lead yields a large amount of semiprocessed products such as fume ash and litharge composed mainly of lead which tend to contribute to complication of the recovery process.

Various methods have been hitherto proposed to simplify these complicated treatment processes and to recover the aforementioned valuable metals more economically and advantageously. These methods include subjecting the anode slime to flotation to remove substantial amounts of the lead contained therein before entering into the actual recovery process. For example, one of these methods comprises oxidizing a suspension of the anode slime in a sulfuric acid solution (about 200g/l) at a temperature above 70°C by passing air therethrough while it is being stirred in order to leach copper therefrom and subjecting the remaining anode slime to a flotation treatment, as is illustrated in FIG. 1.

However, these methods are disadvantageous in that the net yields of gold, silver, selenium and the like carried into the floated material is as low as 85 to 95%, and the separation of lead as tailings, which are their main objects, are unsatisfactory, whereby, they have not yet been put into practice.

Since the anode slime usually is in the form of fine particles having a particle size not greater than $50\mu$, the slime has been subjected to a copper leaching treatment or a flotation treatment without having undergone any mechanical treatment such as grinding and crushing in the conventional methods. We have examined sections of anode slime particles under a microscope and found that the anode slime particles are composed of aggregates each made up of finer particles as is shown in the photomicrograph of FIG. 6, and each finer particle is composed of an outer layer comprising silver selenide and gold telluride and a core comprising lead in the form of lead sulfate. In other words, the lead is present as lead sulfate which is wrapped by the outer layer. In the photomicrograph, the white portion represents the silver selenide and gold telluride, while the gray-black portion wrapped by the white portion represents the lead sulfate.

We have made various studies to develop a method to separate the wrapped lead sulfate from the outer layer consisting of the silver selenide and gold telluride, and, as a result, have arrived at a conclusion that frictional and abrasive action by attrition is especially useful for this purpose.

SUMMARY OF THE INVENTION

It is an object of the present invention to provide a process for the flotation of anode slime from copper electrolysis which comprises subjecting the anode slime to the frictional and abrasive action by attrition in combination with a copper leaching treatment in a medium of an acid solution to remove an outer layer consisting of silver selenide and gold telluride in the slime particles and thereafter subjecting the attrition treated slime to flotation to ensure a complete separation of lead from the slime.

It is another object of the present invention to provide a method of treating the floated material of extremely low lead content resulting from the flotation.

The nature, further features, and utility of this invention will be more clearly apparent from the following detailed description, beginning with a consideration of general aspects of the invention and concluding with specific examples of practice illustrating preferred embodiments of the invention, when read in conjunction with the accompanying illustrations briefly described below.

BRIEF DESCRIPTION OF THE ILLUSTRATIONS

In the illustrations:

Figure 5:
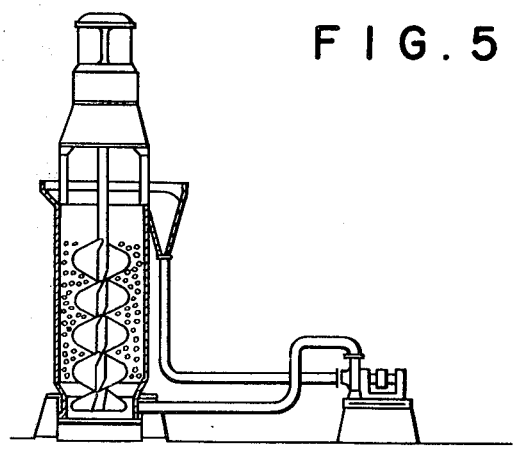

FIGS. 4(A) and 4(B) are system diagrams respectively indicating one example of the process of treating anode slime according to one process of the prior art and one example of the process of treating anode slime according to this invention;

FIG. 5 is an elevation, with a part cut away, showing a tower mill; and

Figure 6:
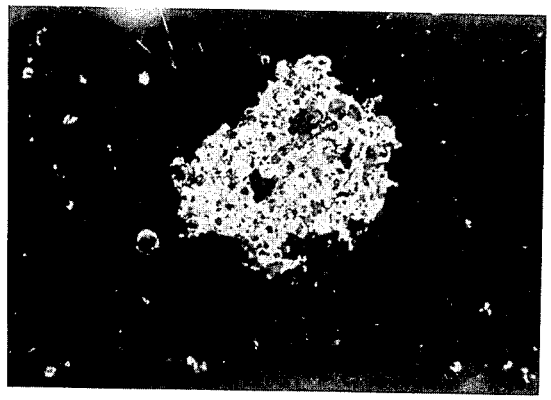
Figure 7:

FIGS. 6 and 7 are photomicrographs respectively showing the states of anode slime which has undergone no attrition treatment and anode slime which has undergone an attrition treatment respectively.

DETAILED DESCRIPTION

Figure 1:
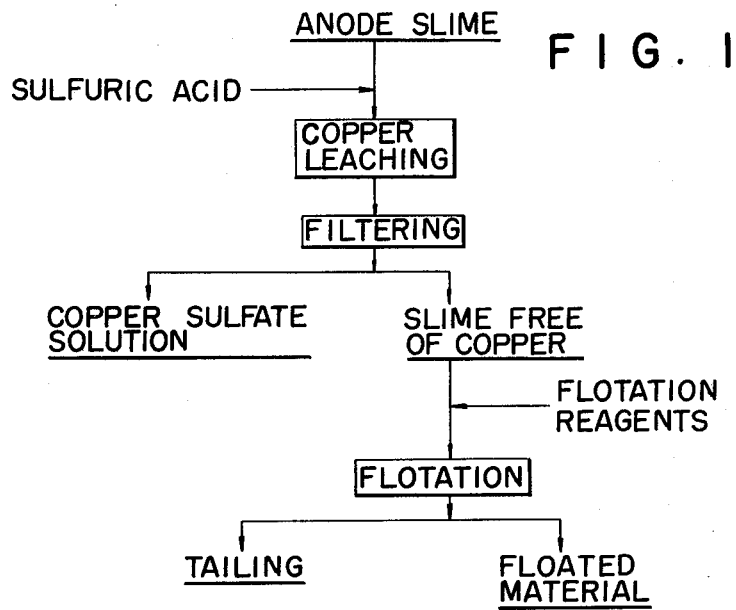
FIG. 1 is a system diagram indicating one example of a prior art flotation of anode slime from copper electrolysis.
Figure 2:
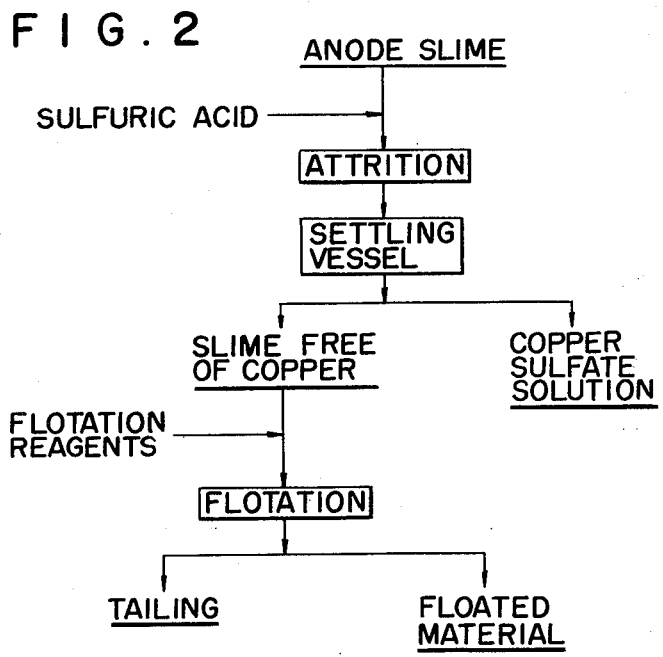
FIG. 2 is a system diagram indicating one example of the present invention wherein a copper leaching treatment of anode slime from copper electrolysis and an attrition treatment thereof are simultaneously carried out.
Figure 3:
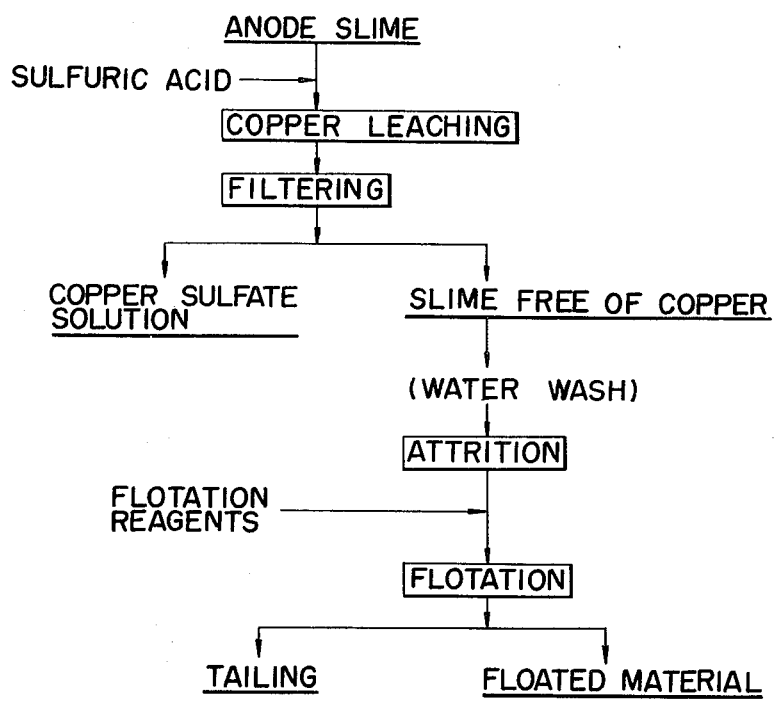
FIG. 3 is a system diagram indicating another example of the present invention wherein an attrition treatment is carried out subsequently to a copper leaching treatment.

In the process of the present invention, the attrition treatment may be carried out simultaneously with the copper leaching treatment of the anode slime in a medium of an acid solution or may be conducted subsequently to the copper leaching treatment. The flow sheets of these two processes are shown in FIGS. 2 and 3.

In FIG. 7, a microphotograph illustrating the state of the anode slime rubbed and abraded by the attrition treatment is shown. In the microphotograph, the white portion indicates silver selenide or gold telluride. Visual examination of this microphotograph reveals that when the anode slime particles are subjected to the attrition treatment, the outer layer thereof comprising silver selenide and gold telluride is gradually rubbed off because of the frictional and abrasion action. Consequently, since the lead sulfate involved in the outer layer is separated from the silver selenide and gold telluride, the probability of floating of gold, silver and selenium is extremely improved, while the lead is satisfactorily isolated, thereby producing tailings enriched in lead.

In addition, it was determined that the floating ability of the gold, silver and selenium is independent of the acidity of a flotation bath as long as the bath is acidic.

In practice, this attrition treatment may be carried out in, for example, an attrition mill, a tower mill, and a closed circuit comprising sand pumps and a tank. The slime particles may be advantageously wet rubbed and abraded in the closed circuit.

With respect to the period of the attrition treatment, there is a certain optimum or proper level. However, it will be understood for those skilled in the art that the proper level of the attrition period can be determined experimentally in connection with a certain combination of particle size of anode slime, concentration of pulp dimension of attrition apparatus, rotational or flow speed. In determining these operational conditions, description of Examples set forth hereinafter will be helpful.

When the flotation effect obtained when the anode slime was subjected to the frictional and abrasion action by the attrition treatment prior to flotation was compared with that obtained when it was not subjected to this pretreatment, the results as shown in Table 1 was obtained.

From Table 1 it is apparent that the former is much higher in net yields of gold, silver and selenium carried into floated material than the latter and gives a high extraction of lead.

Table 1

| | | Flotation Result (percentage) | |
|---|---|---|---|
| | | Attrition | No attrition |
| Au | Charge material | 100.0 | 100.0 |
| | Floated material | 99.7 | 93.0 |
| | Tailing | 0.3 | 7.0 |
| Ag | Charge material | 100.0 | 100.0 |
| | Floated material | 99.8 | 94.0 |
| | Tailing | 0.2 | 6.0 |
| Se | Charge material | 100.0 | 100.0 |
| | Floated material | 99.7 | 94.0 |
| | Tailing | 0.3 | 6.0 |
| Pb | Charge material | 100.0 | 100.0 |
| | Floated material | 7.0 | 30.0 |
| | Tailing | 93.0 | 70.0 |

The floated material resulting from the flotation treatment is treated in the following manner.

After washing and dehydration, the floated material is charged into a rotary furnace lined with refractory bricks and subjected to oxidizing roasting under a direct flame to volatilize the major portion of the selenium contained therein and thereby to recover it. In this case, because of its very low content of lead, the floated material may be roasted in the completely powdery form, and the volatilization rate of the selenium is increased to 2 times that in the conventional method, whereby the time required for the oxidizing roasting can be greatly reduced.

When the volatilization of the selenium is completed, the roasted slime is then melted. Since the roasted slime contains little lead and other gangues as a result of the flotation treatment, there is no need to add reducing agents and fluxes to reduce lead and to form slag as in the conventional method. Therefore, it is possible to conduct separation of a very small amount of slag from crude silver highly enriched in gold and silver values merely by melting the remaining roasted slime adhering to the inner wall of the rotary furnace at increased temperatures. After removing a small amount of the separated slag, the crude silver remained in the rotary furnace may be further subjected to a conventional cupellation process. In this manner, the crude silver may be more easily refined than the conventional noble lead and converted to a high quality silver anode in a shorter period.

In the treatment of the floated material as stated above, little semiprocessed products such as fume ash and litharge composed mainly of lead are formed as in the conventional method. Further, three processes, namely, roasting, melting, and cupellation, may be continuously carried out in a single rotary furnace. Accordingly, the treatment method according to the present invention makes it possible to obtain a good quality silver anode at a higher net yield and to achieve a higher improvement in treatment capacity of apparatuses than the conventional treating method.

As can be seen from FIGS. 4(A) and 4(B) wherein a system diagram indicating one example of the process of treating anode slime according to the present invention is shown in comparison with a system diagram indicating one example of the process of treating anode slime according to the conventional process, the present process brings about a substantial reduction in treating process.

The present invention will be further illustrated by the following examples which are set forth for purposes of illustration only and not as limitations to the scope of the present invention.

EXAMPLE 1

An anode slime with a copper content of 21.05% was charged into a 10-m$^3$ capacity, acid-resistant circulating vessel to which a sulfuric solution having a concentration of 200 g per liter was added to adjust the concentration of the pulp to 25% (by weight). The resulting pulp was drawn out from the bottom of the circulating vessel via two sand pumps, and the drawn pulp was discharged over above the vessel from delivery ports at a rate of 5m per second and brought into a head-on collision therebetween, thereafter being returned to the circulating vessel. This operation was continuously carried out for 15 hours. After the slime particles were subjected to the frictional and abrasion action by such attrition operation, the resulting pulp was filtered to separate the resulting solution of copper sulfate from the slime. Analysis of the product thus obtained showed that it contained Au 1.07%, Ag 27.20%, Cu 0.52%, Pb 24.24%, and Se 18.89%.

Then, 1,000 parts (dry basis) of this slime was diluted with water to a pulp concentration of 15% by weight. The resulting pulp was subjected to a flotation treatment using a Denver Flotation Machine, Model 910 having 8 sections. The results are shown in Table 2. Table 2 indicates that the yields of gold, silver and selenium all exceed 99% and a high grade lead concentrate was obtained as a tailing. Further, the net yield of tellurium in the floated material was 98.7%.

The flotation treatment was conducted under the following conditions:

| | |
|---|---|
| Pulp concentration (% by weight) | 15 % |
| pH | 2.0 |
| Foaming agent, M.I.B.C. | 70g/slime.T |
| Collector, Erofloat No. 208 | 50g/slime.T |
| Amount of pulp treated | 50l/min |
| M.I.B.C. = methylisobutylcarbinol | |
| Erofloat 208 = dithiophosphoric acid | |

Table 2

| | Flotation Result | | |
|---|---|---|---|
| | Charge material | Floated material | Tailing |
| Amount of slime (part) | 1,000 | 650 | 350 |
| Analysis (%) | | | |
| Au | 1.07 | 1.64 | 0.01 |
| Ag | 27.20 | 41.78 | 0.13 |
| Se | 18.89 | 27.01 | 0.09 |
| Pb | 24.24 | 2.54 | 64.55 |
| Amount of slime (%) | 100 | 65.0 | 35.0 |
| Net yield (%) | | | |
| Au | 100 | 99.69 | 0.31 |
| Ag | 100 | 99.83 | 0.17 |
| Se | 100 | 99.83 | 0.17 |
| Pb | 100 | 6.80 | 93.20 |

4.23 tons of the floated material was charged into a rotary furnace of 2.6-m inner diameter and 2.6-m length, lined with refractory bricks and was subjected to oxidizing roasting to volatilize the major portion of the selenium contained therein. After the volatilization of the selenium was completed, the remaining sintered slime adhering to the inner wall of the rotary furnace was melted at a temperature of 1,200° to 1,400°C without the addition of reducing agents and fluxes. The molten slime was separated into 0.5 ton of slag and crude silver with a 92% content of silver.

After the slag was removed from the rotary furnace through a drawing port, the crude silver remaining in the rotary furnace was subjected to a conventional cupellation process therewithin for a period of about 10 hours thereby to produce 1.8 tons of good quality silver containing 3.8% gold and 95.2% silver. In addition, in the course of these treatments, little semiprocessed products such as fume ash and litharge were produced.

EXAMPLE 2

1,000 parts (dry basis) of an anode slime from which copper had been removed, and which contained Au 0.75%, Ag 26.5%, CuO 0.30%, Pb 22.72%, and Se 11.09%, was adjusted to a pulp concentration of 50% by weight with the addition of water. The resulting pulp was charged into a tower mill of 400-mm inner diameter and 2,000-mm height having five blades 270mm long and filled with 500 kg of steel balls of 20-mm diameter (the tower mill being schematically illustrated in FIG. 5). The charged pulp was abraded by operating the tower mill at a rotational speed of 75 rpm.

Thereafter the abraded pulp was diluted with water to a concentration of 10%, and the diluted pulp was subjected to a flotation treatment by using a Denver Flotation Machine, Model 910 having 8 sections. The results are shown in Table 3. It is apparent from Table 3 that the net yields of gold, silver and selenium all exceeded 99%, and a high grade lead concentrate was obtained as a tailing. Further, the net yield of tellurium in the floated material was 97.6%.

The flotation treatment was conducted under the following conditions;

| | |
|---|---|
| Pulp concentration (% by weight) | 10% |
| pH | 4.0 |
| Foaming agent M.I.B.C. | 100g/slime.T |
| Collector, Erofloat No. 208 | 60g/slime.T |
| Amount of pulp treated | 70l/min |

Table 3

| | Flotation Result | | |
|---|---|---|---|
| | Charge material | Floated material | Tailing |
| Amount of slime (part) | 1,000 | 625 | 375 |
| Analysis (%) | | | |
| Au | 0.75 | 1.20 | 0.01 |
| Ag | 26.50 | 42.35 | 0.09 |
| Se | 11.09 | 17.70 | 0.08 |
| Pb | 22.72 | 1.96 | 57.32 |
| Amount of slime (%) | 100 | 62.5 | 37.5 |
| Net yield (%) | | | |
| Au | 100 | 99.72 | 0.28 |
| Ag | 100 | 99.88 | 0.12 |
| Se | 100 | 99.73 | 0.27 |
| Pb | 100 | 5.40 | 94.60 |

5.03 tons of the floated material was charged into a rotary furnace of 2.6-m inner diameter and 2.6-m length, lined with refractory bricks and was subjected to oxidizing roasting under direct flame to volatilize the major portion of the selenium contained therein. Upon completion of the volatilization of the selenium, the remaining sintered slime adhering to the inner wall of the rotary furnace was melted at a temperature of 1,200° to 1,400°C without the addition of reducing agents and flux. The molten slime was separated into 0.7 ton of slag and crude silver with a 93% content of silver.

After the slag was removed from the rotary furnace through a drawing port, the crude silver remaining in the rotary furnace was subjected to a conventional cupellation process therewithin for a period of about 9 hours. As a result, 2.14T of good quality silver containing 2.7% gold and 96.3% silver was obtained.

In addition, in the course of these treatments, little semiprocessed products such as fume ash and lead oxide were produced.

We claim:

1. A process for treatment of anode slime from copper electrolysis which comprises flotation of the anode slime by subjecting the anode slime, as a preliminary treatment, to attrition treatment in combination with a copper leaching treatment in a medium of an acid solution.

2. The process according to claim 1 wherein said attrition treatment is conducted on wetted anode slime.

3. The process according to claim 2 wherein said attrition treatment is carried out in an attrition mill.

4. The process according to claim 2 wherein said attrition treatment is carried out in a tower mill.

5. The process according to claim 2 wherein said attrition treatment is carried out in a closed circuit.

6. The process according to claim 1 wherein the copper leaching treatment is carried out in a medium a sulfuric acid solution.

7. A process for treatment of anode slime from copper electrolysis according to claim 1 in which further comprises subjecting floated material obtained by said flotation continuously to the three processes of roasting, melting, and cupellation in a rotary furnace lined with refractory bricks.

8. The process according to claim 7 wherein the melting process is carried out at a temperature of 1,200° to 1,400°C.

9. The process according to claim 7 wherein the melting process is carried out without the addition of reducing agents and fluxes.

* * * * *